(12) United States Patent
Gaury et al.

(10) Patent No.: US 12,494,341 B2
(45) Date of Patent: Dec. 9, 2025

(54) DELAY TIME MEASUREMENT METHOD AND SYSTEM

(71) Applicant: ASML Netherlands B.V., Veldhoven (NL)

(72) Inventors: Benoit Herve Gaury, Eindhoven (NL); Jasper Frans Mathijs Van Rens, Hegelsom (NL)

(73) Assignee: ASML Netherlands B.V., Veldhoven (NL)

( * ) Notice: Subject to any disclaimer, the term of this patent is extended or adjusted under 35 U.S.C. 154(b) by 283 days.

(21) Appl. No.: 18/120,278

(22) Filed: Mar. 10, 2023

(65) Prior Publication Data

US 2023/0298852 A1 Sep. 21, 2023

Related U.S. Application Data

(63) Continuation of application No. PCT/EP2021/074669, filed on Sep. 8, 2021.

(30) Foreign Application Priority Data

Sep. 11, 2020 (EP) .................................... 20195860

(51) Int. Cl.
*H01J 37/26* (2006.01)
*H01J 37/244* (2006.01)
*H01J 37/28* (2006.01)

(52) U.S. Cl.
CPC .......... *H01J 37/265* (2013.01); *H01J 37/244* (2013.01); *H01J 37/28* (2013.01)

(58) Field of Classification Search
CPC .. H01J 37/00; H01J 37/02; H01J 37/26; H01J 37/265; H01J 37/244; H01J 37/28;
(Continued)

(56) References Cited

U.S. PATENT DOCUMENTS 4,460,866 A * 7/1984 Feuerbaum ............ G01R 27/00
324/501
4,623,836 A 11/1986 Frosien et al.
(Continued)

FOREIGN PATENT DOCUMENTS

JP S5871540 A 4/1983
JP S61207028 A 9/1986
(Continued)

OTHER PUBLICATIONS

International Search Report issued in related Foreign Application No. PCT/EP2021/074669; mailed Dec. 22, 2021 (3 pgs.).
Office Action of the Intellectual Property Office of Taiwan issued in related Taiwanese Patent Application No. 110133503; mailed Apr. 1, 2022 (14 pgs.).
Ciofi, Ivan, et al. "Impact of Wire Geometry on Interconnect RC and Circuit Delay", IEEE Transactions on Electron Devices, vol. 63, No. 6, pp. 2488-2496, Jun. 2016.
(Continued)

*Primary Examiner* — Jason L McCormack
(74) *Attorney, Agent, or Firm* — FINNEGAN, HENDERSON, FARABOW, GARRETT & DUNNER LLP

(57) ABSTRACT

A method of measuring a delay time of a propagation of a signal in a line in a circuit structure, the method comprises irradiating the line by pulses of a charged particle beam, wherein a pulse repetition frequency of the pulses of the charged particle beam is varied. The method further comprises measuring, for each of the pulse repetition frequencies, a secondary charged particle emission responsive to the irradiating the line by the pulses of the charged particle beam at the respective pulse repetition frequency, and deriving the delay time of the line based on the secondary charged particle emission responsive to the varying of the pulse repetition frequency.

15 Claims, 3 Drawing Sheets

(58) Field of Classification Search
CPC .................... G01R 31/305; G01R 31/3016;
G01R 29/023; G01R 29/14; G01R 23/175
USPC ............................................ 250/306, 307, 311
See application file for complete search history.

(56) References Cited

U.S. PATENT DOCUMENTS

| | | | | |
|---|---|---|---|---|
| 5,638,005 | A | * 6/1997 | Rajan | .................. G01R 31/305 |
| | | | | 324/73.1 |
| 6,486,685 | B1 | 11/2002 | Hashimshony | |
| 2011/0215812 | A1 | * 9/2011 | Norimatsu | ............. G01R 31/54 |
| | | | | 324/537 |

FOREIGN PATENT DOCUMENTS

| | | |
|---|---|---|
| JP | S63155737 A | 6/1988 |
| JP | S6472084 A | 3/1989 |
| JP | 2001085282 A | 3/2001 |
| JP | 2012138456 A | 7/2012 |
| TW | 200305724 A | 11/2003 |
| TW | 201611074 A | 3/2016 |

OTHER PUBLICATIONS

Feist, Armin, et al. "Ultrafast transmission electron microscopy using a laser-driven field emitter: Femtosecond resolution with a high coherence electron beam." Ultramicroscopy 176 (2017): 63-73.
Van Rens, J.F.M., et al. "Dual mode microwave deflection cavities for ultrafast electron microscopy." Applied Physics Letters 113.16 (2018): 163104.
Lau, June W., et al. "Laser-free GHz stroboscopic transmission electron microscope: Components, system integration, and practical considerations for pump-probe measurements." Review of Scientific Instruments 91, 021301 (2020); doi: 10.1063/1.5131758.
Cheng, Zh H., et al. "Modeling of local dielectric charging induced by line scan during SEM observation." Journal of Vacuum Science & Technology B, vol. 33, No. 6, Nov./Dec. 2015; doi: 10.1116/1.4936069.
Norio Kuji et al.: "A Fully-Automated Electron Beam Test System for VLSI Circuits", IEEE Design & Test, Oct. 1985, 74-82.

* cited by examiner

DELAY TIME MEASUREMENT METHOD AND SYSTEM

CROSS REFERENCE TO RELATED APPLICATION

This application claims priority of International application PCT/EP2021/074669, which was filed on 8 Sep. 2021, which claims priority of EP application 20195860.0, which was filed on 11 Sep. 2020. These applications are incorporated herein by reference in its entireties.

TECHNICAL FIELD

The embodiments of the present disclosure relate to methods and systems of measuring a delay time of propagation of a signal in a line in a circuit structure.

BACKGROUND

Integrated circuits are designed to work with precisely timed electrical signals. A signal is applied to a node in the integrated circuit and received by another node in the integrated circuit. Thereto, the nodes are interconnected by a line of the integrated circuit, such as a metal line. A delay may occur between a time the signal is applied to the node and the time the signal is received by the other node. The delay, or a deviation of the delay from its intended value, may be detrimental to a proper functioning of the integrated circuit. Circuit delay may depend on the drive a load applied to a line, and on the lines themselves.

SUMMARY

The disclosed technique aims to provide a contactless delay measurement of a line of an integrated circuit.

According to some embodiments of the present disclosure, there is provided a method of measuring a delay time of a propagation of a signal in a line in a circuit structure, the method comprising:
  irradiating the line by pulses of a charged particle beam, wherein a pulse repetition frequency of the pulses of the charged particle beam is varied,
  measuring, for each of the pulse repetition frequencies, a secondary charged particle emission responsive to the irradiating the line by the pulses of the charged particle beam at the respective pulse repetition frequency, and
  deriving the delay time of the line based on the secondary charged particle emission responsive to the varying of the pulse repetition frequency.

According to some embodiments of the present disclosure, there is provided a computer-readable medium storing instructions that, when executed by a computer, cause the computer to perform the method according to the above aspect of the technique.

According to some embodiments of the present disclosure, there is provided a system for measuring a delay time of propagation of a signal in a line in a circuit structure, the system comprising:
  a charged particle beam source configured to irradiate the line by pulses of a charged particle beam, wherein a pulse repetition frequency of the pulses of the charged particle beam is varied,
  a secondary charge particle emission detector to measure, for each of the pulse repetition frequencies, a secondary charged particle emission responsive to the irradiating the line by the pulses of the charged particle beam at the respective pulse repetition frequency, and
  a data processing device configured to derive the delay time of the line based on the secondary charged particle emission responsive to the varying of the pulse repetition frequency.

According to some embodiments of the present disclosure, there is provided a method of determining an RC constant for a node, the method comprising:
  generating electron beam pulses at a variable repetition frequency and directing the electron beam pulses at a node;
  detecting SEs emitted in response to the electron beam pulses;
  determining an RC constant of the node based on the time-averaged detected SEs as a function of the time between electron beam pulses.

According to some embodiments of the present disclosure, there is provided a method of measuring a delay time of a propagation of a signal in a line in a circuit structure, the method comprising:
  irradiating the line by first pulses of a charged particle beam with a temporal spacing T,
  irradiating the line by second pulses of the charged particle beam with the temporal spacing T, wherein the second pulses are retarded in respect of the first pulses by a pulse retardation time and wherein the pulse retardation time is varied,
  measuring, for different values of the pulse retardation time, a secondary charged particle emission responsive to the irradiating the line by the first and second pulses of the charged particle beam, and
  deriving the delay time of the line based on the secondary charged particle emission responsive to the varying of the pulse retardation time.

According to some embodiments of the present disclosure, there is provided a computer-readable medium storing instructions that, when executed by a computer, cause the computer to perform the method according to the above aspect of the technique.

According to some embodiments of the present disclosure, there is provided a system for measuring a delay time of propagation of a signal in a line in a circuit structure, the system comprising:
  a charged particle beam source configured to irradiate the line by first pulses of a charged particle beam with a temporal spacing T and to irradiate the line by second pulses of the charged particle beam with the temporal spacing T, wherein the second pulses are retarded in respect of the first pulses by a pulse retardation time and wherein the pulse retardation time is varied,
  a secondary charge particle emission detector to measure, for different values of the pulse retardation time, a secondary charged particle emission responsive to the irradiating the line by the first and second pulses of the charged particle beam, and
  a data processing device configured to derive the delay time of the line based on the secondary charged particle emission responsive to the varying of the pulse retardation time.

According to some embodiments of the present disclosure, there is provided a method of determining an RC constant for a node, the method comprising:
  generating first electron beam pulses with temporal spacing T and directing the first electron beam pulses at a node;

detecting first SEs emitted in response to the first electron beam pulses;

generating second electron beam pulses with temporal spacing T and with a variable delay with respect to the first electron beam pulses, and directing the second electron beam pulses at the node;

detecting second SEs emitted in response to the second electron beam pulses; and determining an RC constant of the node based on monitoring the time-averaged SE signal as a function of the delay.

DETAILED DESCRIPTION

Figure 1:
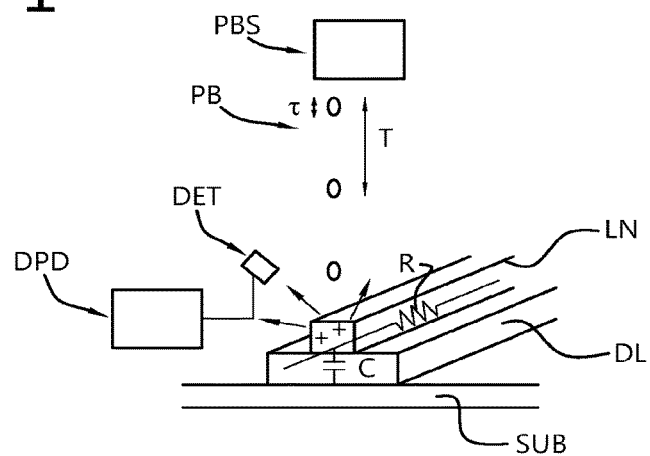
FIG. 1 depicts the irradiation of a line by a charge particle beam.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims. For example, although some embodiments are described in the context of utilizing electron beams, the disclosure is not so limited. Other types of charged particle beams may be similarly applied. Furthermore, other imaging systems may be used, such as optical imaging, photodetection, x-ray detection, extreme ultraviolet inspection, deep ultraviolet inspection, or the like.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC, thereby rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur. It may be desirable to have higher throughput for defect detection and inspection processes to meet the requirements of IC manufacturers.

Integrated circuits are designed to work with precisely timed electrical signals. A signal is applied to a node in the integrated circuit and received by another node in the integrated circuit. Thereto, the nodes are interconnected by a line of the integrated circuit, such as a metal line. A delay may occur between a time the signal is applied to the node and the time the signal is received by the other node. The delay, or a deviation of the delay from its intended value, may be detrimental to a proper functioning of the integrated circuit. Circuit delay may depend on the drive a load applied to a line, and on the lines themselves.

Integrated circuits, such as computer chips, may run at high speeds, so the lines that connect the circuits need to transmit data at high speeds. Sometimes these lines have manufacturing defects that cause them to be slow and cause the computer chip to not meet speed requirements. It is desirable to detect such defects as early as possible, so that one can either fix that chip to get rid of that defect or fix the manufacturing process so that future chips do not have the defect.

Present tests may only provide a usable determination of defects in lines at a late stage, e.g. weeks after the step of manufacturing the line itself.

Accordingly, a technique disclosed herein proposes a contactless delay measurement which may be used at an early stage of manufacturing.

The inventors have realized that the delay time of a line in an integrated circuit may be measured by contactlessly charging the line by an electrical charge and measuring the time it takes for the charge to flow away. The contactless charging is performed by emitting charged particle beam pulses onto the line, such as electron beam pulses. As a consequence of the incident charge particles, the line tends to emit such particles, also referred to as secondary emission. The secondary emission changes as the line is electrically charged. Namely, as a result of the charge of the line, secondary electrons tend to be pulled back to the line, thus reducing the effective secondary emission. According to the present technique, the time between subsequent pulses is varied. In case the subsequent electron beam pulse arrives when charge from the preceding electron beam pulse has leaked away, the secondary emission responsive to the subsequent pulse is unchanged. However, in case the subsequent electron beam pulse arrives when charge from the preceding electron beam pulse has not yet leaked away, the secondary emission responsive to the subsequent pulse is reduced as a result of the remaining charge of the line. By varying the time between the pulse and the subsequent pulse, an effect on the secondary emission is observed. According to the present technique, the discharging rate of the line is derived from the effect of the varying of the time between pulse and subsequent pulse on the secondary emission. According to the present technique, the discharging rate of the line represents the delay of the line.

According to existing techniques, while a wafer is being manufactured, electrical properties of circuits are tested by use of scribe line test structures. The circuits on the product die cannot be tested yet, as the chip has no I/O pads that can be probed until late in the manufacturing process. The scribe line test structures are very limited and do not accurately reflect on-die circuits. On die circuits cannot be tested until weeks after initial metallization, which is much later than is desirable.

Scribe line tests may be performed by a probe card that physically connects the input/output pads of a circuit to record currents, voltages and frequencies. Scribe line tests may not be entirely safe for the wafer as they may induce mechanical stress and may create manufacturing yield loss. Also, these tests are not performed on the die themselves. Testing of the dies may be performed during yield tests, i.e. at a later stage in an integrated circuit manufacturing process.

It would be desirable to measure the delay time at an earlier stage of manufacture on the dies themselves.

FIG. 1 depicts a pulsed beam source PBS that generates a pulsed charged particle beam PB, i.e. time pulses of charged particles being directed to an integrated circuit, in particular to a line structure LN on a dielectric layer of a substrate SUB of an integrated circuit. The charged particle beam may be formed by any suitable charged particles, such as electrons. Other examples of the charged particles may include protons. In some embodiments of the present disclosure, an electron beam will be used.

When the electron beam is pulsed, the line is irradiated by a plurality of pulses of the electron beam. Such a pulsed electron beam could be created using ultrafast photo-emission using mode-locked lasers, microwave cavities, traveling wave transmission strip lines or microstrips, by chopping a continuous electron beam using fast electrostatic blankers, or by a combination of these techniques. A time between subsequent pulses of the electron beam is defined as a pulse repetition time T, i.e. a pulse repetition frequency 1/T. The pulse repetition frequency may be varied along a pulse repetition frequency range. A time duration t of the pulse may be smaller than the RC-time: t<<RC.

The RC time of the line is formed by the series resistance R and the parasitic capacitance C towards the surroundings of the line, e.g. towards the substrate SUB, adjacent lines, etc. The delay time may be determined by the RC time. However, according to the present technique, inductive effects may also play a role in the delay of the line.

The line delay may, for example, be a function of the electrical series resistance R of the line and the capacitance) of the line to its surroundings. A series inductance of the line may also contribute to delay. Integrated circuits may initially be designed to minimize resistance and capacitance, as well as inductance, hence minimizing delay of the line. However, a manufacturing process of the integrated circuit (lithography, etching, etc.) may introduce variations in the line and the surroundings which may induce e.g. undesired parasitic resistances and capacitances. As a result, an effective delay of the line may deviate from an expected delay of the line.

Electron pulses of for example 100 fs duration may be created by laser-triggered sources as well as by microwave cavity chopped sources. Other examples of the duration of the electron pulses are 1 ps or 10 ps. In an example of a Transmission Electron Microscope (TEM), the pulse repetition frequency of the electron pulses may for example be varied over a frequency range below 100 MHz. A beam chopper (for example based on a traveling wave metallic comb stripline) may create pulses of 30 ps (for 300 kV electrons) of which the repetition frequency may be continuously variable between, for example, 40 MHz and 12 GHz. The disclosed technique can be utilized in various types of charged particle systems, including a scanning electron microscope (SEM), a focused ion beam, etc.

When irradiating the pulsed electron beam onto the line, a negative potential of the line may result. The negative potential of the line may be inversely proportional to a capacitance of the line. The line capacitance may be a parasitic capacitance of the line relative to its surroundings in the substrate structure, i.e. in the integrated circuit. The higher the capacitance of the line, the less a voltage difference between the line and the surroundings will occur as a result of application of a fixed amount of charge. The decrease of the potential of the line per pulse may be proportional to a pulse power and pulse length of the pulses of the electron beam.

However, when irradiating such pulsed electron beam onto the line, secondary electron emission may occur from the line. In general terms, when irradiating the line by a charged particle beam, secondary charged particle emission may occur. When a secondary electron yield of the line is larger than one, a number of secondary electrons emitted per incident electron is larger than one. As a result, the potential of the line increases instead of decreasing as the number of incident electrons result in an emission of a larger number of secondary electrons. Correspondingly, any incident electron pulse may create a positive potential on the wafer surface, more specifically on the line. The smaller the electrical capacitance of the line, the larger the potential due to a given amount of charged particles impacting the line.

The resulting positive potential may decrease as a function of time, as the electrical charge leaks away, e.g. resistively. The positive potential on the line may affect the excited secondary electrons, in that the potential on the line may pull the secondary electrons back to the surface of the wafer. As a result, a measured secondary electron emission may be reduced.

When a time between two consecutive electron pulses is much longer than the RC time of the metallic wire, a resulting charge may have discharged itself to a large extent, causing the potential will be too weak to affect the excited secondary electrons and the number of counts on the Secondary Electron, SE, detector DET. However, when the subsequent electron pulse hits the line before the charge has completely leaked away, a measured secondary emission associated with the subsequent pulse may be affected by remaining potential.

By varying a time between subsequent pulses, a change in secondary emission may be observed. As long as the time between the subsequent pulses exceeds the delay time of the line, the net charge of the line may have leaked away before a following pulse. However, with increasing frequency, i.e. a decreasing time between subsequent pulses, the remaining charge on the line may affect a net secondary emission. By measuring the net secondary emission as a function of the time between subsequent pulses, the delay time may be derived therefrom. The delay time of the line, e.g. the RC time of the line, may be derived from a relation between the measured secondary electron emission and the pulse repetition frequency, as the secondary emission is affected by remaining charge from a previous pulse, i.e. when the time between subsequent pulses is the same or smaller than the RC time. The time between subsequent pulses, may be varied over a time range which includes the delay time. The delay time may be derived from the secondary emission, as the secondary emission is affected by remaining charge from a previous pulse in case the time between the previous pulse and the present pulse (the time between subsequent pulses) is approximately the same or smaller than the delay time.

An effect on the secondary electron emission may depend on a secondary electron emission yield. As described above, in case the secondary electron emission yield is larger than one, one incident electron will result in average in more than one secondary electron emission, causing a net outflux of electrons, thus a net outflux of negative charge. A positive charge of the line will result, providing that some of the secondary emitted electrons will return to the line as a result of the net electrostatic force between the positively charged line and the negatively charged secondary electrons. On the other hand, in case the secondary electron emission yield is smaller than one, one incident electron will result in average in less than one secondary electron emission, causing a net influx of electrons, thus a net influx of negative charge. A negative charge of the line will result. Negative charging may increase the secondary emission and may hence result in an increased measured signal.

Some embodiments will be described in the below.

Figure 2A:
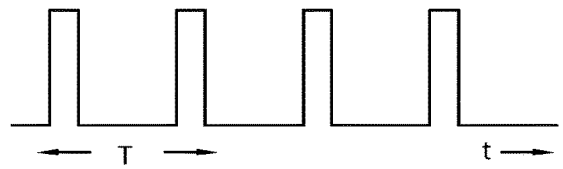
FIGS. 2A and 2B depict a time diagram of electron beam pulses respectively a time diagram of line potential and secondary charged particle emission.
Figure 2B:
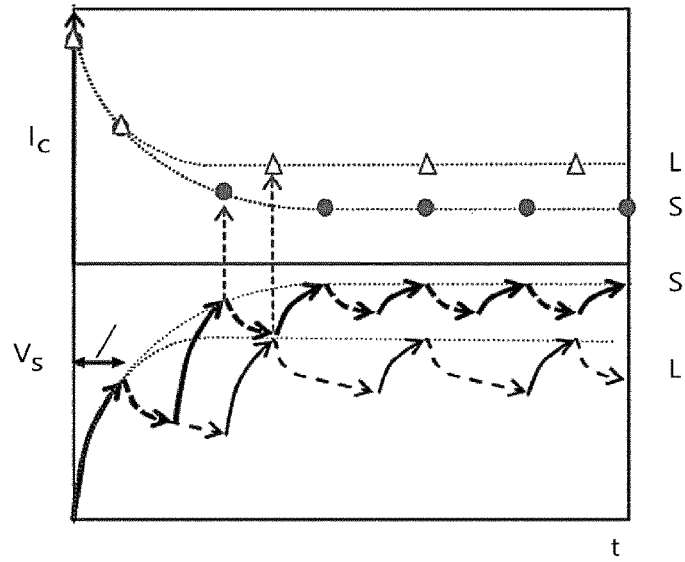

FIG. 2A depicts a pulse train of incident electron pulses. The incident electron pulses are repetitive at a pulse repetition time T and associated pulse repetition frequency. A resulting wafer potential build up is depicted in FIG. 2B (lower part) and a resulting secondary electron emission as detected by the detector DET is depicted in FIG. 2B (upper part). As shown in FIG. 2B, the potential will build up with each incident electron pulse. After some pulses, the potential build up may stabilize. Similarly, after some pulses, the secondary electron signal as detected by the detector may stabilize. The stabilization may result in a time-averaged, elevated line potential, pulling secondary electrons SE back to the wafer surface and therefore effectively reducing the SE-signal measured by detector DET.

As explained above, the level of the secondary electron signal as detected by the detector may relate to the repetition time between the subsequent pulses. More specifically, the secondary electron signal may be reduced or increased as a function of the repetition frequency of the pulses, in case the repetition time of the pulses is similar to or smaller than the RC time of the line. The bottom part of FIG. 2B depicts the potential build up for two different repetition times between the pulses, short S and long L. The top part of FIG. 2B depicts the resulting secondary electron current Ic for the two different repetition times between the subsequent pulses, short S and long L. As seen from FIG. 2B, an example in which the secondary electron yield is greater than one, at the shorter time between the subsequent pulses, a higher potential may be built up and a correspondingly lower secondary electron signal may be detected. Therefore, measuring the time-averaged SE signal as a function of the time between consecutive electron pulses T offers a way to probe the RC time of the metallic wire, as follows from FIG. 3.

Figure 3:
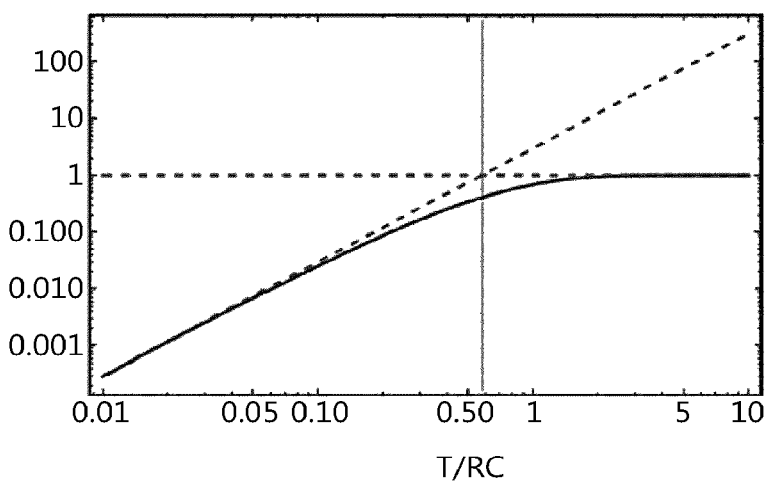
FIG. 3 depicts a diagram of secondary charged particle emission as a function of pulse repetition time.

FIG. 3 depicts a plot with logarithmic axes along the vertical as well as the horizontal axis, plotting the secondary electron current along the vertical axis versus the time between subsequent pulses along the horizontal axis. As shown in FIG. 3, a kink in the resulting relation between secondary electron current as detected and the time between the pulses may be observed, whereby for times between the subsequent pulses above the kink, a horizontal part is observed. In this case, the charge from one pulse has leaked away before the next pulse arrives. For times between the subsequent pulses below the kink, a sloping part is observed. In this case, the charge from one pulse has not yet leaked away before the next pulse arrives. The dashed lines are asymptotes for T<<RC and T>>RC (yellow). The 'kink' in this log log plot may be given by $T=RC/[sqrt(3)phi/(eV\_0)]$, with phi the metal work function in eV and V_0 the line potential created a single electron pulse.

Thus, the RC time may be derived from the repetition time at which the kink in the curve is observed. It is noted that FIG. 3 may also be depicted using the repetition frequency along the horizontal axis instead of the repetition time. The roll off at low repetition times may then translate into a roll off at high repetition frequencies. Thus, the delay time may be determined as a high frequency roll off point in a curve of the secondary charged particle emission as a function of the pulse repetition frequency.

The determination of the delay time from the secondary emission as measured by the detector DET may be performed by a data processing device DPD, e.g. a computing device provided with suitable program instructions. It is noted that the data processing device may also control the pulsed charged particle beam source, e.g. to control the pulse repetition time between the subsequent pulses.

The present technique may enable to perform a contactless measurement of the delay of a line of the circuit structure, and may be performed on a die.

An aspect of the technique provides a method of measuring a delay time of a propagation of a signal in a line in a circuit structure, the method comprising:
  irradiating the line by pulses of a charged particle beam, wherein a pulse repetition frequency of the pulses of the charged particle beam is varied,
  measuring, for each of the pulse repetition frequencies, a secondary charged particle emission responsive to the irradiating the line by the pulses of the charged particle beam at the respective pulse repetition frequency, and
  deriving the delay time of the line based on the secondary charged particle emission responsive to the varying of the pulse repetition frequency.

An aspect of the technique provides a computer-readable medium storing instructions that, when executed by a computer, cause the computer to perform the method according to the above aspect of the technique.

An aspect of the technique provides a system for measuring a delay time of propagation of a signal in a line in a circuit structure, the system comprising:
  a charged particle beam source configured to irradiate the line by pulses of a charged particle beam, wherein a pulse repetition frequency of the pulses of the charged particle beam is varied,
  a secondary charge particle emission detector to measure, for each of the pulse repetition frequencies, a secondary charged particle emission responsive to the irradiating the line by the pulses of the charged particle beam at the respective pulse repetition frequency, and
  a data processing device configured to derive the delay time of the line based on the secondary charged particle emission responsive to the varying of the pulse repetition frequency.

An aspect of the technique provides a method of determining an RC constant for a node, the method comprising:
  generating electron beam pulses at a variable repetition frequency and directing the electron beam pulses at a node;

detecting SEs emitted in response to the electron beam pulses;

determining an RC constant of the node based on the time-averaged detected SEs as a function of the time between electron beam pulses.

A further example will be described with reference to FIGS. 4-6.

Figure 4:
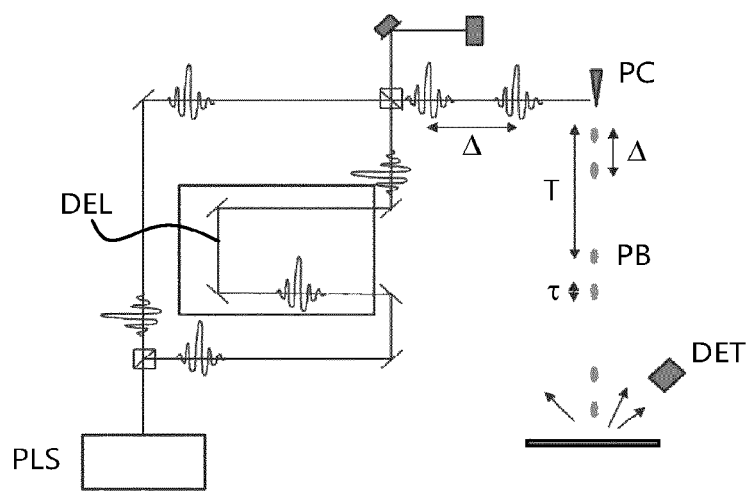
FIG. 4 depicts an embodiment of a device for generating a charged particle beam.

FIG. 4 depicts a laser, such as in the present example a femtosecond laser that generates femtosecond laser pulses. The laser pulses are provided to a splitter that splits the laser pulses into two optical paths, one path comprising a delay stage to delay the laser pulses. A combiner combines the dual optical paths, i.e. the direct optical path and the optical path with the delay stage, so as to combine the laser pulses (first pulses) and the delayed laser pulses (second pulses).

A photo cathode is arranged in the combined optical path, so as to be excited by the laser pulses (first pulses) and the delayed laser pulses (second pulses). Correspondingly, the photo cathode emits first electron beam pulses responsive to the laser pulses and delayed, second, electron beam pulses responsive to the delayed laser pulses.

Figure 5A:
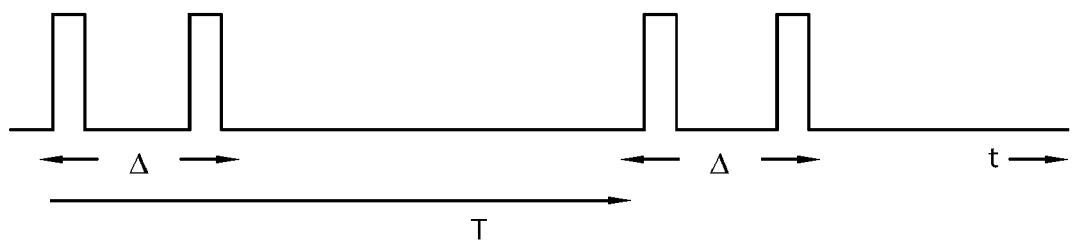
FIGS. 5A and 5B depict a time diagram of electron beam pulses respectively time diagrams of secondary charged particle emission as a function of delay time between consecutive pulses.
Figure 5B:
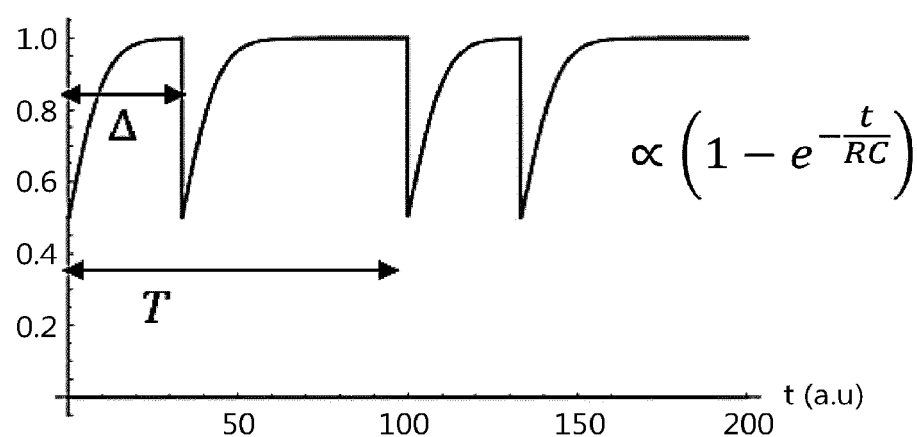
Figure 5B:
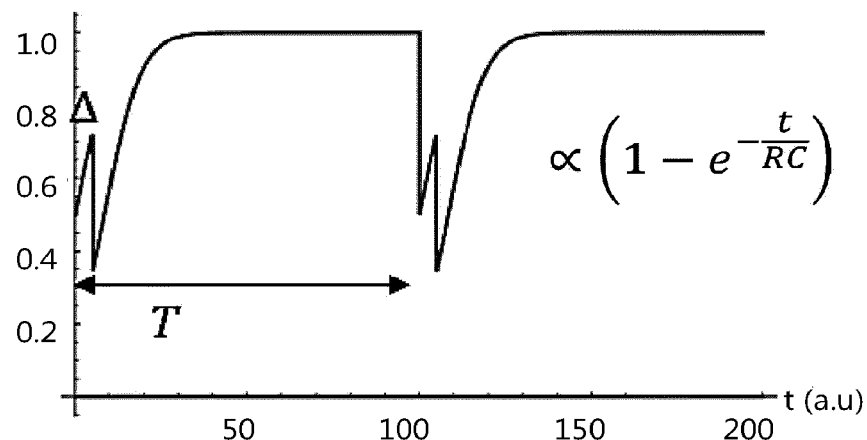

FIG. 5A depicts a resulting waveform of pulses and delayed pulses, i.e. the first and second pulses. The time between the subsequent pulses being formed by the delay time (also denoted as A) between the pulses and the delayed pulses, also referred to as retarded pulses. Along the lines of the above description, a charging of the line takes place as a result of the net effect of the incident electron beam pulse and the resulting secondary electron emission. The resulting charge of the line leaks away according to the RC time of the line. A resulting waveform of the wafer potential is depicted in FIG. 5B. In FIG. 5B, top figure, the time between the pulse and the delayed pulse exceeds the RC time of the line, thus causing the charge resulting from the first pulse to have leaked away before the delayed, second pulse. In FIG. 5B, bottom figure, the time between the pulse and the delayed pulse is smaller than the RC time of the line, thus causing the charge resulting from the delayed pulse to accumulate to a remainder of the charge from the pulse. As a result of the accumulation of charge from the pulse and the delayed pulse, a detected secondary emission responsive to the delayed pulse will change as the delay time decreases to the order of magnitude of the RC time or below. The time between the delayed pulse and a following pulse is larger than the pulse delay time, causing the accumulated charge of the two pulses to have leaked away.

When the time between the first and second electron pulses is much longer than the RC time of the metallic wire, a resulting charge may have discharged itself to a large extent, causing the potential will be too weak to affect the excited secondary electrons and the number of counts on the Secondary Electron, SE, detector DET. However, when the subsequent, second, electron pulse hits the line before the charge associated with the first pulse has completely leaked away, a measured secondary emission associated with the subsequent, second, pulse may be affected by remaining potential.

By varying a time between the first and second pulses, a change in secondary emission may be observed. As long as the time between the first and second pulses exceeds the delay time of the line, the net charge of the line may have leaked away before a following pulse. However, with increasing frequency, i.e. a decreasing time between subsequent pulses, the remaining charge on the line may affect a net secondary emission. By measuring the net secondary emission as a function of the time between subsequent pulses, the delay time may be derived therefrom. The delay time of the line, e.g. the RC time of the line, may be derived from a relation between the measured secondary electron emission and the pulse repetition frequency, as the secondary emission is affected by remaining charge from a previous pulse, i.e. when the time between subsequent pulses is the same or smaller than the RC time. The time between the first and second pulses, may be varied over a time range which includes the delay time. The delay time may be derived from the secondary emission, as the secondary emission is affected by remaining charge from a previous pulse in case the time between the previous pulse and the present pulse (the time between subsequent pulses) is approximately the same or smaller than the delay time.

Similarly as described with reference to FIGS. 1-3, the delay time of the second pulse is varied over a range, thus causing the time between the first pulse and the delayed second pulse (the subsequent pulses) to vary over the range of pulse repetition times. For each of the delay times of the delayed pulse, i.e. for each of the resulting times between the pulse and the delayed pulse, the secondary emission responsive to the delayed pulse is measured.

An expected behavior of the secondary emission is given by $1-\exp(-t/RC)$.

Figure 6:
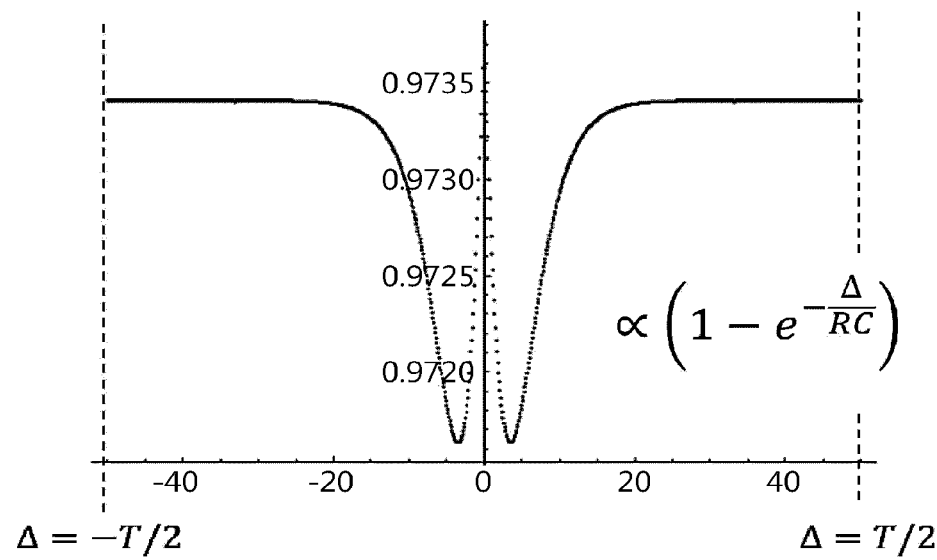
FIG. 6 depicts a time-integrated secondary charged particle emission as function of delay time between consecutive pulses.

FIG. 6 depicts a correlation of the measured time integrated secondary emission versus the time between the subsequent pulses for different RC times. Peaks in the correlation are shown, indicating a value of the RC time that has a highest correlation with the expected behavior of the measured secondary emission versus the time between the pulses.

An aspect of the technique provides a method of measuring a delay time of a propagation of a signal in a line in a circuit structure, the method comprising:

irradiating the line by first pulses of a charged particle beam with a temporal spacing T, irradiating the line by second pulses of the charged particle beam with the temporal spacing T, wherein the second pulses are retarded in respect of the first pulses by a pulse retardation time and wherein the pulse retardation time is varied, measuring, for different values of the pulse retardation time, a secondary charged particle emission responsive to the irradiating the line by the first and second pulses of the charged particle beam, and deriving the delay time of the line based on the secondary charged particle emission responsive to the varying of the pulse retardation time.

An aspect of the technique provides a computer-readable medium storing instructions that, when executed by a computer, cause the computer to perform the method according to the above aspect of the technique.

An aspect of the technique provides a system for measuring a delay time of propagation of a signal in a line in a circuit structure, the system comprising:

a charged particle beam source configured to irradiate the line by first pulses of a charged particle beam with a temporal spacing T and to irradiate the line by second pulses of the charged particle beam with the temporal spacing T, wherein the second pulses are retarded in respect of the first pulses by a pulse retardation time and wherein the pulse retardation time is varied, a secondary charge particle emission detector to measure, for different values of the pulse retardation time, a secondary charged particle emission responsive to the irradiating the line by the first and second pulses of the charged particle beam, and a data processing device configured to derive the delay time of the line based on the secondary charged particle emission responsive to the varying of the pulse retardation time.

An aspect of the technique, provides a method of determining an RC constant for a node, the method comprising:
generating first electron beam pulses with temporal spacing T and directing the first electron beam pulses at a node;
detecting first SEs emitted in response to the first electron beam pulses;
generating second electron beam pulses with temporal spacing T and with a variable delay with respect to the first electron beam pulses, and directing the second electron beam pulses at the node;
detecting second SEs emitted in response to the second electron beam pulses; and
determining an RC constant of the node based on monitoring the time-averaged SE signal as a function of the delay.

As the delay time between the pulse and the delayed pulse may be substantially shorter than the repetition time of the pulses, the example described with reference to FIGS. 4-6 may be employed to measure delay times, i.e. RC times, that are shorter than the delay times that may be measured with the example described with reference to FIGS. 1-3.

Note that for both laser-triggered sources and microwave cavity sources, a typical pulse duration can be of the order of 100 fs, and the repetition frequency can vary from 1 kHz to 100 MHz. Therefore, the condition $\tau \ll RC \ll T$ can be easily met for RC=6 ps.

In the described embodiments, a pulse width of the subsequent pulses may be smaller than the pulse repetition time.

The measurements may be repeated, and the measured secondary emission may be averaged per pulse repetition time, to reduce noise and other disturbances. Accordingly, for each pulse repetition time, the irradiating the line by at least two subsequent pulses is repeated, the secondary charged particle emission responsive to the at least two subsequent pulses is measured with each repetition, and the measured secondary charged particle emissions for each repetition time are averaged.

When averaging, the delay time is derived from a change of the averaged secondary charged particle emission as a function of the pulse repetition time between the two subsequent pulses of the charge particle beam.

The embodiments may further be described using the following clauses:

1. A method of measuring a delay time of a propagation of a signal in a line in a circuit structure, the method comprising:
    irradiating the line by pulses of a charged particle beam, wherein a pulse repetition frequency of the pulses of the charged particle beam is varied,
    measuring, for each of the pulse repetition frequencies, a secondary charged particle emission responsive to the irradiating the line by the pulses of the charged particle beam at the respective pulse repetition frequency, and
    deriving the delay time of the line based on the secondary charged particle emission responsive to the varying of the pulse repetition frequency.
2. The method according to clause 1, wherein the pulse repetition is varied over a pulse repetition frequency range which includes a frequency defined by one over the delay time of the line.
3. The method according to clause 1 or 2, wherein the delay time of the line is determined as a high frequency roll off point in the secondary charged particle emission responsive to the varying of the pulse repetition frequency.
4. The method according to any one of the preceding clauses, wherein a pulse width of the pulses is smaller than a pulse repetition time determined by the pulse repetition frequency.
5. The method according to any one of the preceding clauses, wherein for each pulse repetition frequency, the irradiating the line by at least two subsequent pulses is repeated, the secondary charged particle emission responsive to the at least two subsequent pulses is measured with each repetition, and the measured secondary charged particle emissions for each repetition frequency are averaged.
6. The method according to clause 5, wherein the delay time of the line is derived from a relation between the averaged secondary charged particle emission and the pulse repetition frequency.
7. The method according to any one of the preceding clauses, wherein the charged particle beam is an electron beam, the secondary charged particle emission being secondary electron emission.
8. The method according to any one of the preceding clauses, wherein the circuit structure is a die.
9. The method according to any one of the preceding clauses, wherein the pulses of the charged particle beam charge the line to a potential, the potential of the line affecting the secondary charged particle emission, the delay time of the line being derived from a decay of the potential of the line, the decay of the potential of the line being derived from an effect of a change of the pulse repetition frequency on the secondary charged particle emission.
10. A computer-readable medium storing instructions that, when executed by a computer, cause the computer to perform the method according to any one of clauses 1-9.
11. A system for measuring a delay time of propagation of a signal in a line in a circuit structure, the system comprising:
    a charged particle beam source configured to irradiate the line by pulses of a charged particle beam, wherein a pulse repetition frequency of the pulses of the charged particle beam is varied,
    a secondary charge particle emission detector to measure, for each of the pulse repetition frequencies, a secondary charged particle emission responsive to the irradiating the line by the pulses of the charged particle beam at the respective pulse repetition frequency, and
    a data processing device configured to derive the delay time of the line based on the secondary charged particle emission responsive to the varying of the pulse repetition frequency.
12. The system according to clause 11, wherein the charged particle beam source is configured to vary the pulse repetition over a pulse repetition frequency range which includes a frequency defined by one over the delay time of the line.
13. The system according to clause 11 or 12, wherein the data processing device is configured to determine the delay time of the line as a high frequency roll off point in the secondary charged particle emission responsive to the varying of the pulse repetition frequency.
14. The system according to any one of clauses 11-13, wherein a pulse width of the pulses is smaller than a pulse repetition time determined by the pulse repetition frequency.
15. The system according to any one of clauses 11-14, wherein the charged particle beam is configured to repeat, for each pulse repetition time, the irradiating the line by at least two subsequent pulses, the detector being configured to measure the secondary charged particle emission responsive to the at least two subsequent pulses with each repetition, and the data processing device is configured to average the measured secondary charged particle emissions for each repetition time.

16. The system according to clause 15, wherein the data processing device is configured to derive the delay time of the line from a change of the averaged secondary charged particle emission as a function of the pulse repetition time between the two subsequent pulses of the charge particle beam.

17. The system according to any one of clauses 11-16, wherein the charged particle beam is an electron beam, the secondary charged particle emission being secondary electron emission.

18. The system according to any one of clauses 11-17, wherein the circuit structure is a die.

19. The system according to any one of clauses 11-18, wherein the pulses of the charged particle beam charge the line to a potential, the potential of the line affecting the secondary charged particle emission, wherein the data processing device is configured to derive the delay time of the line from a decay of the potential of the line, and to derive the decay of the potential of the line from an effect of a change of the pulse repetition frequency on the secondary charged particle emission.

20. A method of determining an RC constant for a node, the method comprising:
  generating electron beam pulses at a variable repetition frequency and directing the electron beam pulses at a node;
  detecting SEs emitted in response to the electron beam pulses;
  determining an RC constant of the node based on the time-averaged detected SEs as a function of the time between electron beam pulses.

21. A method of measuring a delay time of a propagation of a signal in a line in a circuit structure, the method comprising:
  irradiating the line by first pulses of a charged particle beam with a temporal spacing T,
  irradiating the line by second pulses of the charged particle beam with the temporal spacing T, wherein the second pulses are retarded in respect of the first pulses by a pulse retardation time and wherein the pulse retardation time is varied,
  measuring, for different values of the pulse retardation time, a secondary charged particle emission responsive to the irradiating the line by the first and second pulses of the charged particle beam, and
  deriving the delay time of the line based on the secondary charged particle emission responsive to the varying of the pulse retardation time.

22. The method according to clause 21, further comprising retarding the first pulses by the pulse retardation time to form the second pulses.

23. The method according to clause 21 or 22, wherein the pulse retardation time is smaller than the temporal spacing T.

24. The method according to any one of clauses 21-23, wherein a pulse width of the pulses is smaller than a pulse repetition time determined by the pulse repetition frequency.

25. The method according to any one of clauses 21-24, wherein for each pulse retardation time, the irradiating the line by at least two subsequent pulses is repeated, the secondary charged particle emission responsive to the pulses is measured with each repetition, and the measured secondary charged particle emissions for each pulse retardation time are averaged.

26. The method according to clause 25, wherein the delay time of the line is derived from a relation between the averaged secondary charged particle emission and the pulse repetition frequency.

27. The method according to any one of clauses 21-26, wherein the charged particle beam is an electron beam, the secondary charged particle emission being secondary electron emission.

28. The method according to any one of clauses 21-27, wherein the circuit structure is a die.

29. The method according to any one of clauses 21-28, wherein the pulses of the charged particle beam charge the line to a potential, the potential of the line affecting the secondary charged particle emission, the delay time being derived from a decay of the potential of the line, the decay of the potential of the line being derived from an effect of a change of the pulse retardation time on the secondary charged particle emission.

30. A computer-readable medium storing instructions that, when executed by a computer, cause the computer to perform the method according to any one of clauses 21-29.

31. A system for measuring a delay time of propagation of a signal in a line in a circuit structure, the system comprising:
  a charged particle beam source configured to irradiate the line by first pulses of a charged particle beam with a temporal spacing T and to irradiate the line by second pulses of the charged particle beam with the temporal spacing T, wherein the second pulses are retarded in respect of the first pulses by a pulse retardation time and wherein the pulse retardation time is varied,
  a secondary charge particle emission detector to measure, for different values of the pulse retardation time, a secondary charged particle emission responsive to the irradiating the line by the first and second pulses of the charged particle beam, and
  a data processing device configured to derive the delay time of the line based on the secondary charged particle emission responsive to the varying of the pulse retardation time.

32. The system according to clause 31, wherein the charged particle beam source is further configured to retard the first pulses by the pulse retardation time to form the second pulses s.

33. The system according to clause 31 or 32, wherein the pulse retardation time is smaller than the temporal spacing T.

34. The system according to any one of clauses 31-33, wherein a pulse width of the pulses is smaller than a pulse repetition time determined by the pulse repetition frequency.

35. The system according to any one of clauses 31-33, wherein the charged particle beam source is configured to, for each pulse retardation time, irradiate the line by at least two subsequent pulses is repeated, the secondary charge particle emission detector being configured to measure the secondary charged particle emission responsive to the pulses with each repetition, and the data processing device is configured to average the measured secondary charged particle emissions for each pulse retardation time.

36. The system according to clause 35, wherein the data processing device configured to derive the delay time of the line from a relation between the averaged secondary charged particle emission and the pulse repetition frequency.

37. The system according to any one of clauses 31-36, wherein the charged particle beam is an electron beam, the secondary charged particle emission being secondary electron emission.

38. The system according to any one of clauses 31-37, wherein the circuit structure is a die.

39. The system according to any one of clauses 31-38, wherein the pulses of the charged particle beam charge the line to a potential, the potential of the line affecting the secondary charged particle emission, wherein the data processing device is configured to derive the delay time from a decay of the potential of the line, the decay of the potential of the line being derived from an effect of a change of the pulse retardation time on the secondary charged particle emission.

40. A method of determining an RC constant for a node, the method comprising:
    generating first (pump) electron beam pulses with temporal spacing T and directing the first electron beam pulses at a node;
    detecting first SEs emitted in response to the first electron beam pulses;
    generating second (probe) electron beam pulses with temporal spacing T and with a variable delay $\Delta$ with respect to the first electron beam pulses, and directing the second electron beam pulses at the node;
    detecting second SEs emitted in response to the second electron beam pulses; and
    determining an RC constant of the node based on monitoring the time-averaged SE signal as a function of the delay $\Delta$ 41. The method of clause 40, wherein the electron beam pulses are generated in response to laser pulses being directed at an electron emitter, in which the delay $\Delta$ between two pulse trains is realized by splitting and merging one laser beam and varying the optical path length of one of the branches.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The invention claimed is:

1. A computer-readable medium storing instructions that, when executed by a computer, cause the computer to perform operations comprising:
    irradiating a line by pulses of a charged particle beam, wherein a pulse repetition frequency of the pulses of the charged particle beam is varied,
    measuring, for each of the pulse repetition frequencies, a secondary charged particle emission responsive to the irradiating the line by the pulses of the charged particle beam at the respective pulse repetition frequency, and
    deriving a delay time of the line based on the secondary charged particle emission responsive to the varying of the pulse repetition frequency.

2. The computer readable medium of claim 1, wherein the pulse repetition is varied over a pulse repetition frequency range which includes a frequency defined by one over the delay time of the line.

3. The computer readable medium of claim 1, wherein the delay time of the line is determined as a high frequency roll off point in the secondary charged particle emission responsive to the varying of the pulse repetition frequency.

4. The computer readable medium of claim 1, wherein a pulse width of the pulses is smaller than a pulse repetition time determined by the pulse repetition frequency.

5. The computer readable medium of claim 1, wherein for each pulse repetition frequency, the irradiating the line by at least two subsequent pulses is repeated, the secondary charged particle emission responsive to the at least two subsequent pulses is measured with each repetition, and the measured secondary charged particle emissions for each repetition frequency are averaged.

6. The computer readable medium of claim 5, wherein the delay time of the line is derived from a relation between the averaged secondary charged particle emission and the pulse repetition frequency.

7. A system for measuring a delay time of propagation of a signal in a line in a circuit structure, the system comprising:
    a charged particle beam source configured to irradiate the line by pulses of a charged particle beam, wherein a pulse repetition frequency of the pulses of the charged particle beam is varied,
    a secondary charge particle emission detector to measure, for each of the pulse repetition frequencies, a secondary charged particle emission responsive to the irradiating the line by the pulses of the charged particle beam at the respective pulse repetition frequency, and
    a data processing device configured to derive the delay time of the line based on the secondary charged particle emission responsive to the varying of the pulse repetition frequency.

8. The system according to claim 7, wherein the charged particle beam source is configured to vary the pulse repetition over a pulse repetition frequency range which includes a frequency defined by one over the delay time of the line.

9. The system according to claim 7, wherein the data processing device is configured to determine the delay time of the line as a high frequency roll off point in the secondary charged particle emission responsive to the varying of the pulse repetition frequency.

10. The system according to claim 7, wherein a pulse width of the pulses is smaller than a pulse repetition time determined by the pulse repetition frequency.

11. The system according to claim 7, wherein the charged particle beam is configured to repeat, for each pulse repetition time, the irradiating the line by at least two subsequent pulses, the detector being configured to measure the secondary charged particle emission responsive to the at least two subsequent pulses with each repetition, and the data processing device is configured to average the measured secondary charged particle emissions for each repetition time.

12. The system according to claim 11, wherein the data processing device is configured to derive the delay time of the line from a change of the averaged secondary charged particle emission as a function of the pulse repetition time between the two subsequent pulses of the charge particle beam.

13. The system according to claim 7, wherein the charged particle beam is an electron beam, the secondary charged particle emission being secondary electron emission.

14. The system according to claim 7, wherein the circuit structure is a die.

15. The system according to claim 7, wherein the pulses of the charged particle beam charge the line to a potential, the potential of the line affecting the secondary charged particle emission, wherein the data processing device is configured to derive the delay time of the line from a decay of the potential of the line, and to derive the decay of the potential of the line from an effect of a change of the pulse repetition frequency on the secondary charged particle emission.

* * * * *